Oct. 30, 1956  C. L. DAY ET AL  2,768,656
HEADSPACER
Filed June 22, 1953  6 Sheets-Sheet 2

Fig. 2.

INVENTORS:
Carl L. Day,
Frederick E. Fauth,
BY Cushman, Darby & Cushman
ATTORNEYS.

Oct. 30, 1956

C. L. DAY ET AL 2,768,656

HEADSPACER

Filed June 22, 1953

INVENTORS:
Carl L. Day,
Frederick E. Fauth,
BY Cushman, Darby & Cushman
ATTORNEYS

United States Patent Office 2,768,656
Patented Oct. 30, 1956

2,768,656

HEADSPACER

Carl L. Day and Frederick E. Fauth, Baltimore, Md., assignors to Crown Cork & Seal Company, Inc., Baltimore, Md., a corporation of New York Application June 22, 1953, Serial No. 363,094

24 Claims. (Cl. 141—80)

The present invention relates to a headspacer apparatus for topping filled containers travelling in a straight path and, more particularly, to a pressing or headspacing mechanism for pressing the contents of a filled container into the filled container and providing a headspace therein and to a spacing mechanism for spacing the containers in spaced relationship under the pressing mechanism.

In modern day canning plants or the like, where containers are filled with solid food immersed in a liquid and are then rapidly conveyed to a closing or capping machine, it is necessary to clean the lips of the filled containers of any food products and to provide a headspace therein prior to the closing operation. Obviously, if the container lip is not clean of the food product, the screw and/or vacuum type of closure will not be seated properly and, thus, a perfect seal will not be obtained. Also, oftentimes it is desirable to provide a headspace above the surface of the liquid in the containers when it is desirous of treating the headspace with steam or the like in the use of a vacuum type cap.

In the past, the headspacer or pressing mechanism was designed to be attached to and driven by the closure applying machine. Likewise, the means for spacing the containers beneath the headspacer mechanism was built into and driven by the closure applying machine. Consequently, the canner had to purchase a headspacer apparatus designed and constructed especially for use with his particular type of closure applying machine.

Therefore, an object of the present invention is to provide a headspacer apparatus which is completely independent of the closure applying machine. Ancillary to the above, it is another object of the present invention to provide an apparatus capable of being used with existing conveyor lines in canning plants. By having the apparatus adjustable for different heights, it is obvious that the apparatus will be adjustable to the height of an existing conveyor line in the plant at any position desired between the filling and closure applying machines. The advantages of having an independent unit are, first, the cost of manufacture is materially reduced, and, second, the unit may be used at any station in the conveyor line when it is not advantageous to use it immediately adjacent the closure applying machine.

The present invention provides an apparatus which will operate on a plurality of containers simultaneously to provide a headspace in each during a single cycle of operation. To properly position the containers beneath the headspacing or pressing mechanism so that a plurality of containers will be properly positioned in spaced, timed relationship with the headspacing or pressing mechanism, a cylindrical conveyor element having a helical groove in its periphery is provided to engage and space the containers during their lineal movement on the transfer conveyor. Such an arrangement for spacing containers, whereby they may be operated on by various mechanisms, is usually provided with detector means associated therewith to stop the operation of the apparatus in the event a container becomes jammed with respect to the grooved spacing means. For instance, containers moving toward a grooved cylindrical feeding means may not initially become properly engaged with the groove in the cylindrical spacing element. Normally, a spring urged detector gate is provided to one side of the path of containers opposite the container spacing means. Such detector gates are operable to stop the machine when a container does not quickly become properly engaged within the container spacing means and thus, often times the machine is unnecessarily stopped during the course of operation.

In the copending United States application of Carl L. Day and Rudolph H. Breeback, Serial No. 230,192, filed June 6, 1951, now Patent No. 2,730,226, dated January 10, 1956, means are provided for universally mounting the cylindrical spacing means at its outfeed end and thus the infeed end of the cylindrical spacing means will swing outwardly in the event that a container does not immediately become properly engaged with the groove in the cylindrical spacing means. A detector also is provided on the opposite side of the container in order that it would be operated in the event a container definitely became jammed.

An object of the present invention is to provide a container spacing means which will obviate the need of a detector gate in that the container spacing means will in itself compensate for a jam of containers therein.

Another object of the present invention is to provide a headspacing or pressing mechanism for a topping apparatus which will operate in synchronized timed relationship with a plurality of properly spaced containers to top said containers in a single cycle of operation.

Ancillary to the above object, the present invention relates to an improved drive mechanism for the headspacing or pressing mechanism whereby the piston members which reciprocate into and out of the containers travel in a circular orbit and, thus, eliminate wasted time in the actual pressing operation.

Still another object of the present invention is the provision of a cylindrical spacing means having helical grooves thereon which is capable of spacing containers of various diameters and sizes within a certain range of diameters and sizes.

A still further object of the present invention is providing a spacing mechanism operating in synchronism with the pressing mechanism, both of said mechanisms being driven by an unitary source of power.

Ancillary to the preceding object, it is a further object of the present invention to provide a means of adjusting the speed of rotation of the container spacing means and the circular orbital movement of the pressing means by a single simple adjustment.

These and other objects of the invention will be more apparent from the following specification, claims and drawings, in which:

*General description*

Referring specifically to the drawings and, more particularly, to Figures 1, 2 and 3 of the drawings, the construction and operation of the headspacer apparatus illustrated in the application may be generally described as follows:

The headspacer apparatus includes a frame, generally designated 10 mounted on a base 12 and including a table 14. The upper surface of table 14 is adapted to support the top run of a flat top straight line conveyor 16 on which moves the filled containers A travelling from a filling machine (not shown) to a cap or closure applying machine (not shown). Containers A travel at random on conveyor 16 in a substantially straight path. Base 12 of frame 10 of the apparatus may be adjusted vertically so as to raise or lower the table 14 to accommodate the machine to the height of the straight line conveyor 16.

Mounted on frame 10 adjacent conveyor 16 is an elongated generally cylindrical container spacing element 18. Cylindrical element 18 has its periphery provided with a helical groove 20 for engaging spacing containers A which travel at random in a straight line on conveyor 16. A container guide element or rail 22 having a vertical planar face 24 is mounted on table 14 opposite cylindrical element 18. The purpose of guide element 22 is to confine and direct the incoming containers A into helical grooves 20 of cylindrical element 18. Cylindrical element 18 is mounted on table 10 with its longitudinal axis parallel to and to one side of the path of moving containers in such a manner that it is resiliently urged toward the containers in order that it may be urged away from the containers should there be a jam or should the containers improperly enter grooves 20. A more detailed discussion of the means of mounting element 18 to prevent jams of the containers as they are being spaced will follow in the specification.

Also mounted on frame 10 above and in alignment with conveyor 16 is a headspacer or pressing mechanism generally designated 26. Headspacer mechanism 26 is provided with a plurality of piston members 28 which are adapted to be inserted and removed from filled containers A.

A unitary source of power 30, such as an electric motor or the like, is mounted on frame 10 to drive cylindrical screw or conveyor element 18 in synchronism with headspacer mechanism 26 whereby a plurality of containers travelling on conveyor 16 will be positioned beneath piston members 28 and will be simultaneously acted upon by piston members 28 to provide a headspace therein. The preferred embodiment of the present invention as disclosed in the drawings show the apparatus incorporating three piston members 28 which act simutaneously on three containers spaced therebeneath. However, it is well within the scope of the present invention to either increase or decrease the number of piston members 28 so that any desired number of containers may be acted in a given cycle of headspacer mechanism 26.

*Frame and drive*

As previously stated, the head spacer apparatus, including container spacing element 18 and piston displacement members 28 is mounted on frame 10 and is also driven by a source of power 30 also mounted on frame 10 and, thus, forming an assembly which is completely independent of a cap or closure machine. The advantage of having a completely independent unit allows for freedom of location of the unit in the packing line and, thus, materially increases the utility of the apparatus in use in connection with already existing equipment in the canning plant or the like. Also, by having a completely independent unit, the cost of manufacture and maintenance is materially reduced.

Figure 1:
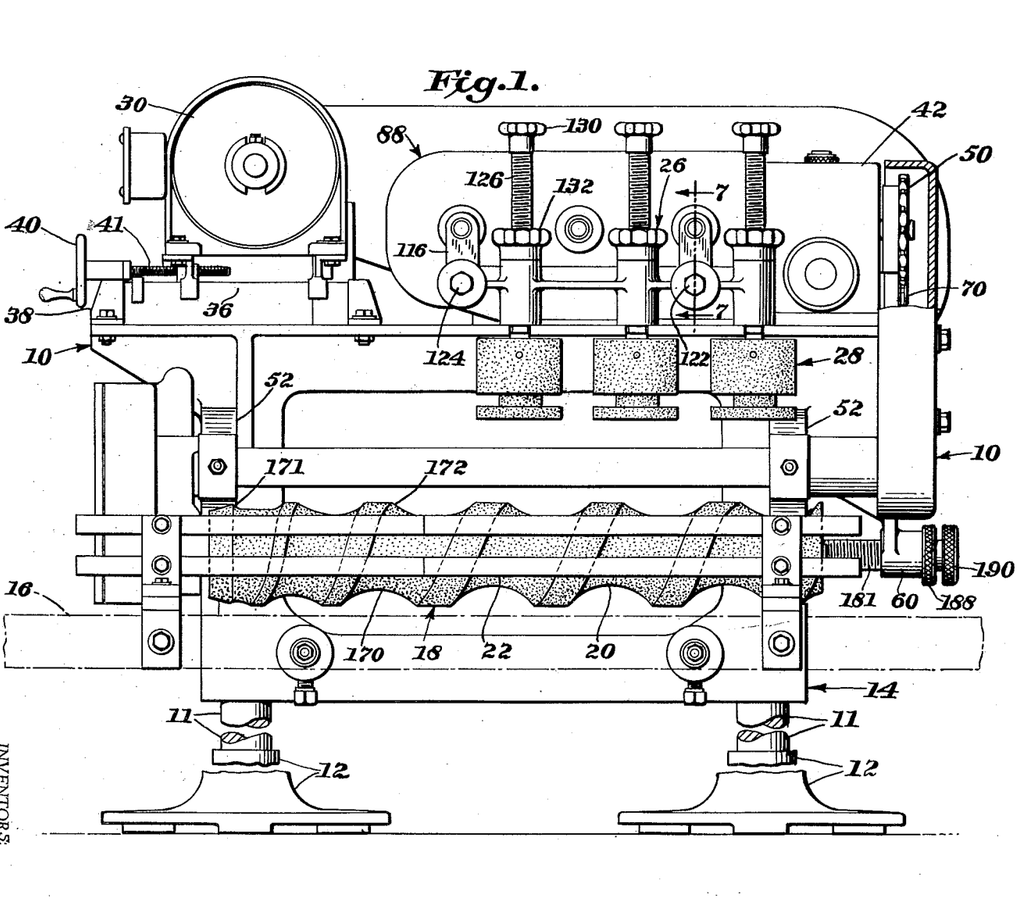
Figure 1 is a side elevational view of the apparatus showing a portion of the drive of the head-spacing elements partially in section.
Figure 2:
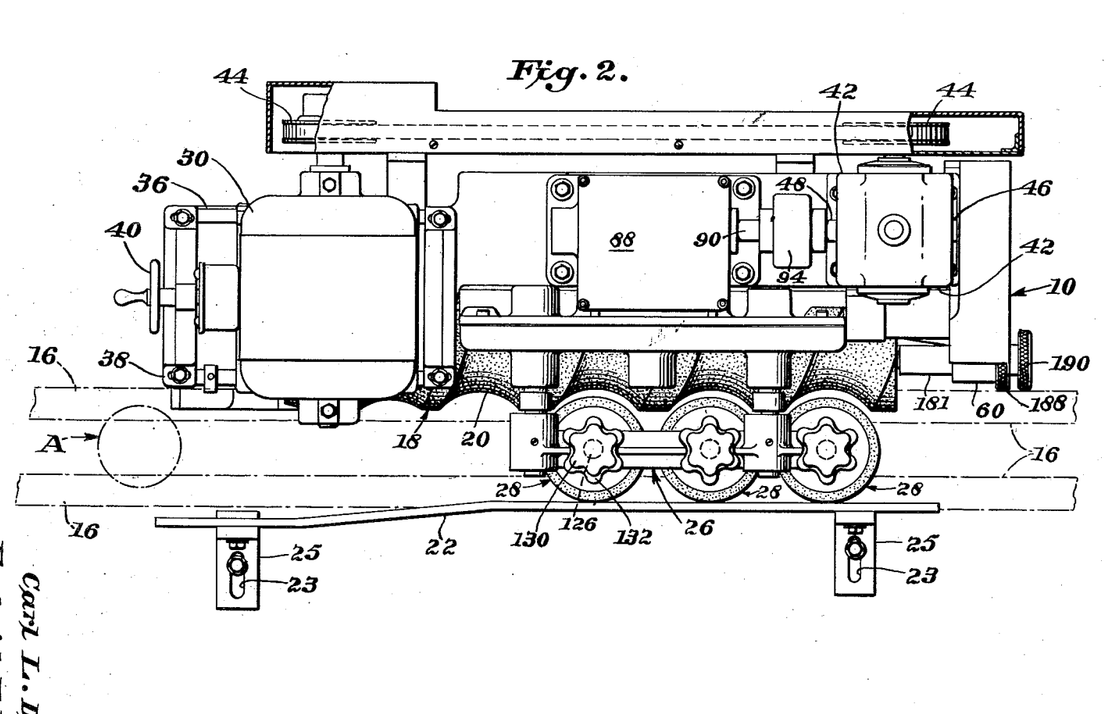
Figure 2 is a plan view, partially in section, of the apparatus disclosed in Figure 1.

Further, it will be noted from Figures 1 and 2 that the container spacing element 18, headspacer mechanism 26 and source of power 30 are all mounted on frame 10 in such a manner as to be positioned on the same side of table 16. Also, each of the foregoing units is mounted above the upper surface of table 16 and, consequently, the drives for each of the units is totally above table conveyor height where they may be readily accessible for maintenance and observation. The feature of consolidating the various units on one side of table 16 will become even more evident later in the specification when a detailed discussion of adjustment of the units is made.

Figure 3:
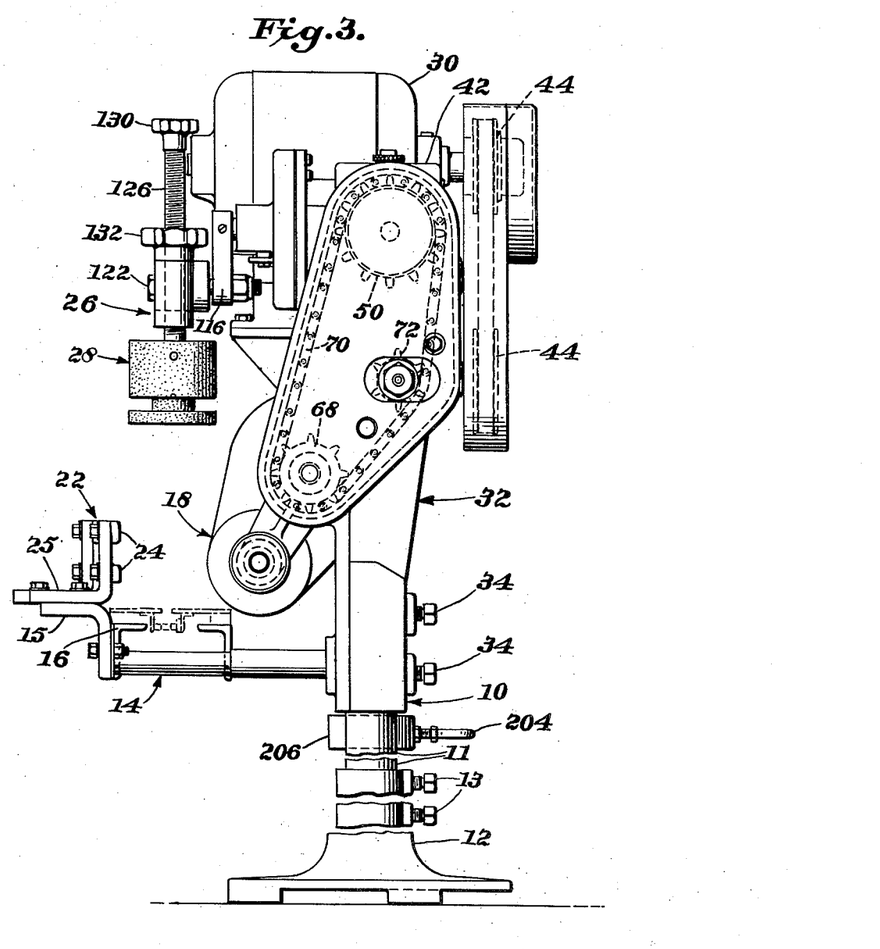
Figure 3 is an end elevational view of the apparatus disclosed in Figure 1 looking from the right end thereof.

As best shown in Figure 3, frame 10 is supported on spaced vertical standards or posts 11 which telescope into the frame and are rigidly secured thereto by the bolts 34. Standards 11 are adapted to telescope into base members 12 and are rigidly supported therein by a plurality of bolts 13. By having standards 11 telescope into base members 12, the frame may be adjusted vertically to any desired height whereby table 14 may be brought into proper position with respect to conveyor 16 which it supports. It is now obvious that to vertically adjust the frame and its work table to a proper height for use with a particular conveyor line, it is merely necessary to loosen adjustment bolts 13 and adjust standards 11 with respect to base 12 to the desired height.

Table 14 extends transversely from frame 10 and supports the top run of endless conveyor 16. Mounted on the outer edge of table 14 are a plurality of longitudinally spaced brackets 15 which support a like number of L-shaped guide rail brackets 21. Guide rails or elements 22 are bolted to brackets 21 so that they have a vertical coplanar face 24 facing the cylindrical element 18. The base members 25 of guide rail brackets 21 are provided with an elongated slot 23 through which the bolts to attach bracket 21 to bracket 15 are passed. By providing slot 23 in base member 25, the position of guide rails 22 may be adjusted transversely of the path of containers and, thus, the apparatus may accommodate containers of various diameters. Of course, there are other adjustments necessary to make the apparatus accommodate various diameter containers and these will be explained in detail in their appropriate place in the specification.

Guide rails 22 taper inwardly toward the path of containers and cylindrical element 18 to a point forward of headspacer mechanism 26. From this point, guide rails 22 extend parallel to the path of containers to a point adjacent the outfeed of the apparatus. Obviously, containers A travelling on conveyor 16 are directed by guide rails 22 into engagement and position with grooves 20.

Mounted on the upper portion 32 of the frame 10 is the unitary source of power 30. It will be noted from Figures 1 and 2 that the base of motor 30 is slidably mounted on the horizontal shafts 36 which are supported on a base member 38. A rotatable hand wheel 40 rotatably supported on base 38 and having a threaded shaft 41 which threadedly engages the base of motor 30 is provided for making the longitudinal horizontal adjustment of the position of motor 30 as rotation of hand wheel 40 will cause motor 30 to slide on the supporting shafts 36.

Positioned on frame 10, at a suitable distance from motor 30, is a speed reductor unit 42 which reduces the speed of motor 30 to such an extent that it can be utilized in driving feed screw 18 and headspacer mechanism 26. Speed reductor 42 is driveably connected to the drive of the motor 30 by means of a "Reeves" type of pulley drive 44. Thus, it is now evident that when the position of the motor 30 is changed relative to the position of speed reductor unit 42, the drive speed of the speed reductor unit is either increased or decreased.

Speed reductor unit 42 is provided with two horizontally opposed driven shafts 46 and 48 respectively. Drive shaft 46 is provided at its outer end with a sprocket gear 50 which is connected to the drive for cylindrical spacing element 18 whereas, on the other hand, the drive shaft 48 is connected to a gear train generally designated 49, which drives headspacer mechanism 26.

Figure 5:
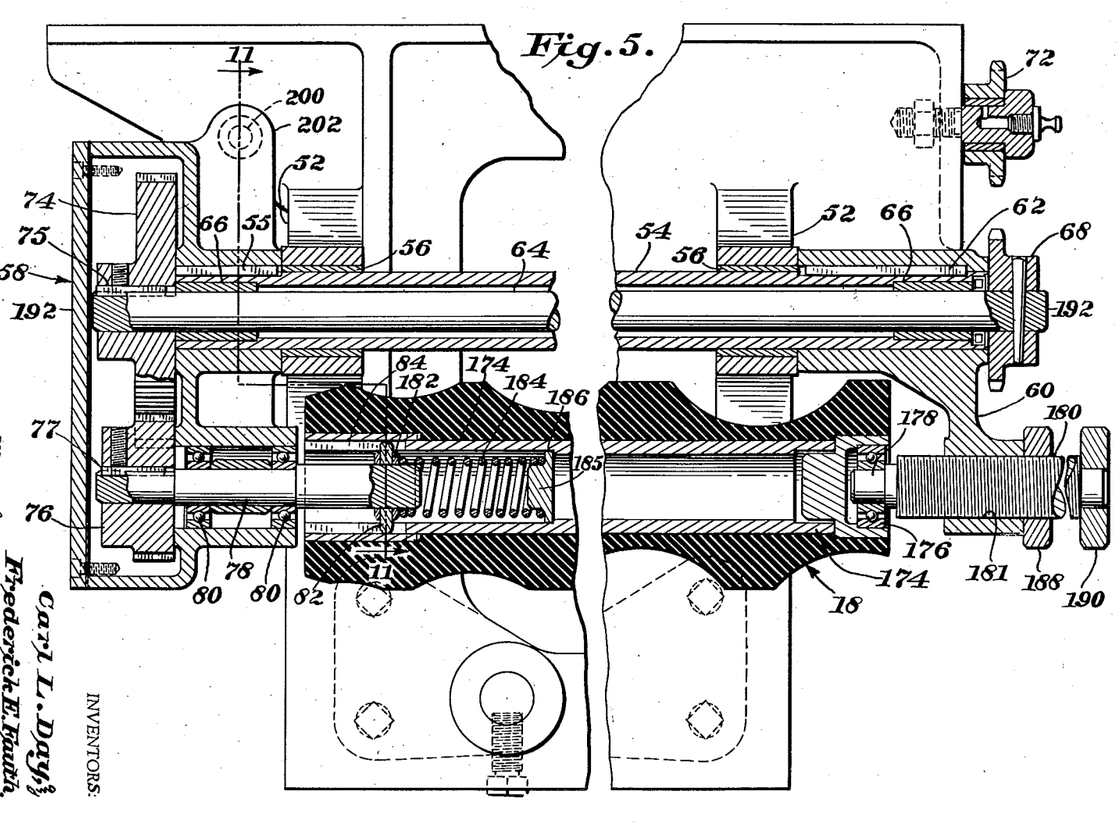
Figure 5 is an enlarged cross-sectional view of the drive mechanism and mounting means for the container feed and spacing element.

Referring specifically to Figures 1, 3 and 5, frame 10 is provided with horizontally spaced and aligned bosses 52 positioned above and to the side of table 14. Journalled in bosses 52 is an elongated torque tube 54. Suitable bushings 56 are provided between torque tube 54 and bosses 52 so that torque tube 54 may rotate with respect to frame 11. Keyed to each end of torque tube 54 are support means for cylindrical container spacing element 18. At the end adjacent the infeed end of cylindrical element 18, a feed screw drive housing 58 is keyed to the torque tube 54 as shown at 55 and supports the infeed end of cylindrical element 18. The other end or outfeed end of cylindrical element 18 is supported by means of the lever arm 60 which is also keyed to the torque tube 54 as shown at 62. Mounted within torque tube 54 for rotation with respect thereto is a drive shaft 64 which transmits power from speed reductor 42 to cylindrical element 18. As previously mentioned, drive shaft 64 is suitably mounted within torque tube 54 for rotation with respect thereto by any suitable means, such as the bushings indicated at 66. Rigidly secured to one end of drive shaft 64 is a gear 68 which is adapted to receive an endless chain drive 70. The chain drive positively connects the sprocket 50 to drive the gear 68 and consequently will rotate drive shaft 64 when sprocket 50 is rotated. A suitable idler gear 72 may be mounted on the frame at any suitable position and may be used to take up the slack in endless chain drive 70.

At the other end of drive shaft 64, a gear 74 is keyed thereto as shown at 75. Gear 74 is located within the housing 58 and meshes with a gear 76 which is keyed, as shown at 77, to a stub shaft 78. Shaft 78, which is mounted in suitable bearings 80 supported in housing 58, is provided at its other end with a lug or transverse pin 82 for engaging a slot 84 in hollow support tube 174 of cylindrical element 18.

In summarizing the drive for the container feed and spacing element 18, it is now easily seen that source of power 30 drives a "Reeves" pulley drive 44 which in turn drives speed reductor 42. Speed reductor 42 is provided with a driven shaft 46 having a sprocket gear 50 thereon which rotates a chain drive 70 to rotate the gear 68 keyed to drive shaft 64 for cylindrical element 18. Drive shaft 64 in turn rotates gear 74 keyed at its other end and which meshes with gear 76. Gear 76 is keyed to a stub shaft 78 which in turn is keyed by means of lug or pin 82 to the cylindrical element 18.

Figures 4, 11:
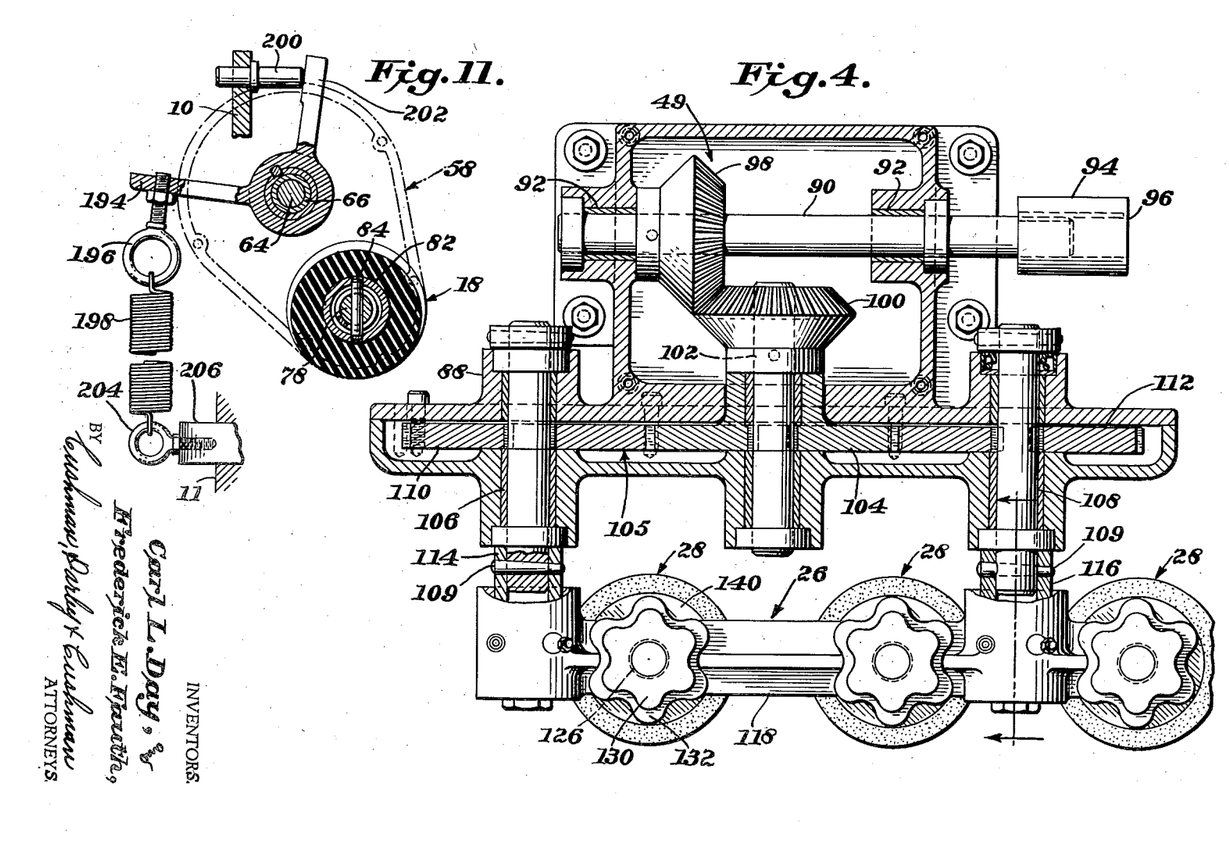
Figure 4 is an enlarged cross-sectional view of the driving gear mechanism for the headspacer piston members.
Figure 11 is a cross-sectional view taken on the line 11—11 of Figure 5.

Referring now to Figures 1, 4, 6 and 7, it will be noted that the frame 10 also supports a gear box housing 88 providing the drive for headspacer mechanism 26. As best shown in Figure 4, gear box housing 88 is provided with a horizontally mounted rotatable shaft 90 journalled therein as indicated at 92. Shaft 90 at one end thereof extends out of housing 88 and is connected to shaft 48 of speed reductor 42. Any suitable means of connecting the shaft 90 to shaft 48 may be used such as the coupling element 94 which is merely a sleeve having a keyway 96 therein for keying the shafts 90 and 48 to each other.

Mounted within housing 88 and rigidly on shaft 90 is a bevelled gear 98. Bevelled gear 98 is adapted to mesh with another bevelled gear 100 which is positively keyed to a shaft 102 also mounted for rotation in housing 88. Shaft 102 is positioned normal to shaft 90 and to the straight line path of containers A. Keyed to shaft 102 is a central gear 104 of a gear train generally designated 105. Spaced on either side of shaft 102 and parallel thereto are rotatable shafts 106 and 108. Shafts 106 and 108 are each provided with gears 110 and 112 keyed respectively thereto and meshing with gear 104. Rigidly mounted to the outer ends of shafts 106 and 108 by pins 109 are crank arms 114 and 116. Crank arms 114 and 116 are keyed to their respective drive shafts 106 and 108 in alignment with each other. Each of crank arms 114 and 116 is provided at its outer end with horizontally extending shafts 122 and 124. A carrier or piston support member 118 is rotatably mounted at one end thereof on shaft 122 and at the other end thereof on the shaft 124. Suitable bearings 120 are provided on each of the shafts 122 and 124 so that the carrier member 118 may rotate with respect to the shafts 122 and 124 when the cranks 116 and 114 are rotated. Mounted on carrier member 118 in spaced relationship with each other are the plurality of piston displacement members 28.

In summation of the drive of the headspacer mechanism 26, it is now quite obvious that when source of power 30 operates the speed reductor 42 through the "Reeves" drive 44, the drive shaft 48 will in turn rotate shaft 90. Shaft 90 has mounted thereon a bevelled gear which meshes with a gear train and the gear train in turn operates to rotate the cranks 114 and 116 simultaneously in aligned parallel relationship. Since cranks 114 and 116 have a carrier element rotatably attached to their outer ends, the carrier element 118 will have a movement in a circular orbit when the cranks are rotated. Further, the movement of carrier element 118 in a circular orbit will carry with it piston displacement members 28 mounted thereon and they also will move in a vertical circular orbit whereby they will reciprocate relative to the filled moving containers passing therebeneath.

*Headspacer mechanism*

In previously describing the headspacer apparatus generally and in the description of the drive for the headspacer mechanism 26 it was brought out that the preferred embodiment of the invention included three piston displacement members adapted to simultaneously move into and out of a moving container to provide the container with a headspace. Although it is not specifically shown in the drawings, it is within the contemplation of the invention that the specific drive described above could be used when one or more piston displacement members 28 are used in conjunction with a moving container.

It has been pointed out briefly that the piston displacement members have a movement in a vertical plane through a circular orbit. By having piston members 28 move in a vertical circular orbit, the headspace in the containers is provided for efficiently and quickly. In order that the depth in which the piston displacement member 28 enters the container may be varied for various operations and types of food products, the piston members 28 are individually adjustably mounted on the carrier member 118. By having piston member 28 adjustable, it further enhances the utility of headspacer apparatus in that the apparatus can be quickly and efficiently adjusted for use with a run of containers of different height. The reason for individually adjusting each of the piston members is so that slight adjustment may be made to compensate for wear in the drive of the carrier member 118 or the piston members 28.

To accomplish the above adjustment, piston members 28 are each provided with a threaded vertically extending shaft 126. Piston support or carrier member 118 is provided with a plurality of vertically spaced threaded holes 128 which are each adapted to receive one of the threaded shafts 126. Each threaded shaft 126 is provided at its upper end with a knob 130 having means thereon to grip and turn the shaft.

To insure that shafts 126 will maintain their proper adjusted position, a lock nut 132 is threaded onto the shafts so that it may be jammed against top surface of piston support or carrier element 118 to rigidly lock the shafts in position. In making an adjustment of the headspacer mechanism, it is merely necessary to release or back off lock nut 132 from the shoulder 134 of piston carrier member 118 on which it abuts. Once lock nut 132 is backed off of shoulder 134 the knob 130 can be rotated to vertically adjust piston member 28 upwardly or downwardly as the case may be.

In packaging of various types of food products, it is often necessary that the food products be covered with a liquid such as brine or syrup. To provide for the displacement of the liquid when piston member 28 is lowered into the container to compress the contents therein, means are provided in the piston member 28 to remove the liquid from the container when the piston member is lowered therein, and return it to the container when the piston member is removed therefrom. Thus, the piston members of the present invention accomplish with one unit what has formerly required a compound action; that is, the piston members will clear the sealing surface of the container and press down the product therein while retaining the liquid and returning it to the container when removed therefrom.

The improved piston members 28 of the present invention are made of a resilient material such as rubber or its substitutes. The advantage of making the piston members 28 of rubber is so that means can be provided whereby the piston members will center the container accurately thereunder should the container be slightly off center when being fed by cylindrical element 18. A further advantage of having the piston members made of rubber is that they can be cheaply manufactured and quickly and easily replaced when worn or when different diameter containers are to be used.

Figures 6, 7, 8:
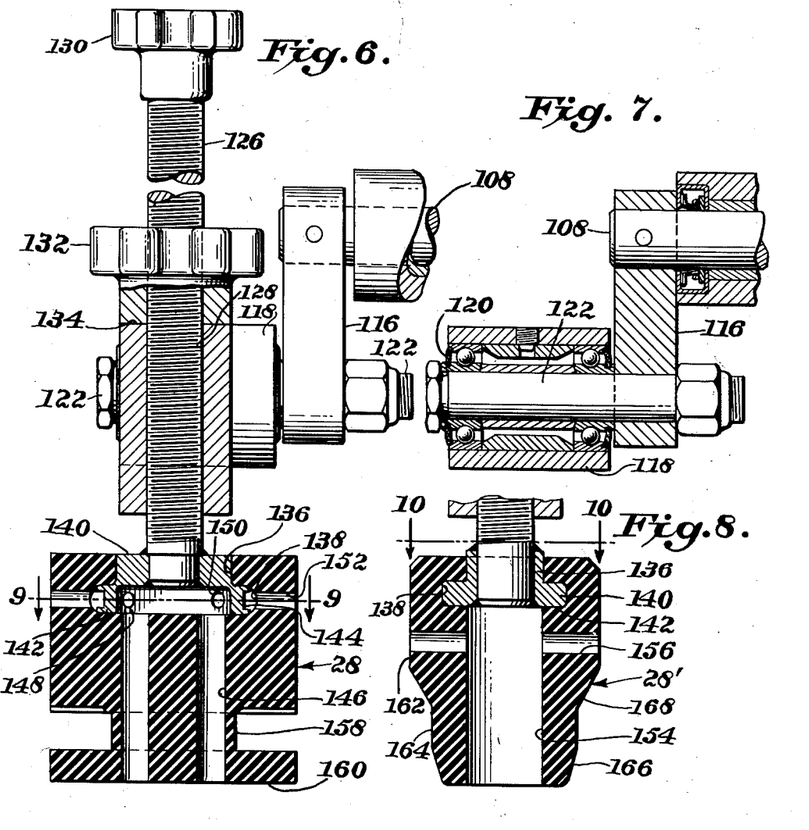
Figure 6 is an enlarged end elevational view partially in section, of the headspacer piston member and the means for mounting the same.
Figure 7 is an enlarged fragmentary cross-sectional view of the means of mounting the head-spacer piston member on the rotatable crank elements as taken on the line 7—7 of Figure 1.
Figure 8 is an enlarged cross-sectional view of a modified form of the piston member disclosed in Figure 6.
Figures 9, 10:
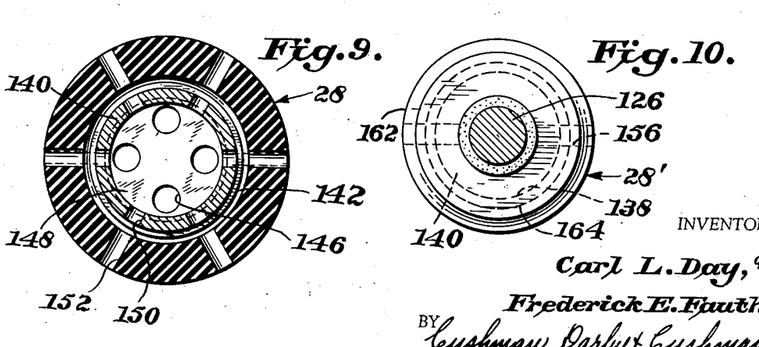
Figure 9 is a cross-sectional view taken on the line 9—9 of Figure 6.
Figure 10 is a cross-sectional view taken on the line 10—10 of Figure 8.

Referring specifically to Figure 6, piston member 28 is provided at its upper end with a bore 136 having an enlarged counter-bore 138 therein. Attached to the lower end of threaded shaft 126 is a piston retaining element 140 which has a diameter substantially equal to the diameter of the bore 136. At the lower end of the element 140 a circumferential flange 142, which has a diameter substantially equal to the diameter of counter-bore 138, is provided. Therefore, when it is necessary to change piston member 28, it will be only necessary to remove the piston member from element 140 by extending the bore 136 so that flange 142 may pass therethrough. A new piston may then be slipped on the retaining element and the apparatus is again ready for operation.

As shown in Figure 6, piston member 28 is provided with a plurality of vertical passages 146 which communicate with a recess 148 in element 140. Element 140 is provided with a peripherial groove 144 on flange 142. A plurality of radially extending passages 150 are provided in flange 142 and these passages communicate with a like number of radial passages 152 in piston member 28. When piston member 28 is lowered into a container, the liquid in the container can rise in the vertical passages 146 since they are in open communication with atmosphere through passages 150 in flange 142 and passages 152 in piston member 28.

Referring now to Figure 8, a modified form of the piston member is disclosed and is generally indicated as 28'. The means of attaching piston member 28' to shaft 126 is substantially the same means as previously described in reference to Figure 6 and, therefore, it is not believed necessary to go into details of the construction of element 140 and the bore 136. However, it is well to note that in the modified form of piston member 28' a vertical bore 154 extends throughout the piston member and communicates with counter-bore 138. Communicating with vertical bore 154 at a position below counter-bore 138 are a plurality of spaced, radially extending passages 156. The operation of piston member 28' is the same in regards to the displacement of liquid from a container; that is, the liquid will rise in bore 154 since the bore 154 is in open communication with atmosphere through passages 156. When the piston is raised the liquid will flow out of the bore back into the container and, thus, will cover the pressed food product therein.

Piston members 28 and 28' as disclosed in Figures 6 and 8 respectively are both adaptable to centering a container beneath them should the container be slightly off center when spaced by the container feed and spacing screw element 18. In Figure 6, resilient or flexible piston member 28 is provided with a deep circumferential groove 158, spaced a short distance from the bottom thereof. Deep circumferential groove 158 provides for a flange 160 and it is this flange 160 which will flex should a container be slightly off center when the piston member 28 is entering. Thus, the container will center itself as piston member 28 enters therein and there is no danger that the container will be damaged prior to entering a capping machine. Figure 8 on the other hand shows a modified form of resilient rubber piston member 28 wherein the lower portion thereof is of reduced diameter. The upper portion 162 is of substantially the same diameter as the diameter of the inside of the container, whereas the diameter of the lower portion 164 is substantially smaller so that if the container is off center the lower portion will still enter the container and the container will center itself under piston member 28' as the piston member is lowered. To further insure the smooth operation in centering an off center container, lower portion 164 is bevelled inwardly at its lower end as shown at 166 and tapered outwardly at its upper end as shown at 168 into the upper portion 162.

*Container feeding and spacing mechanism*

In order that the headspacer mechanism will operate satisfactorily and efficiently, means must be provided to accurately space the containers beneath the plurality of piston members 28 so that the plurality of piston members 28 may simultaneously act on a like number of containers travelling on the straight line conveyor 16. As previously stated, the means for spacing the containers accurately beneath the topping or headspacing mechanism is elongated cylindrical element 18 having on its periphery helical groove 20. Cylindrical element 18 has a peripherial diameter which is substantially constant from its outfeed end to a point, shown at 171, adjacent the infeed end and is then of decreasing diameter from that point to its infeed end. The purpose of having the infeed end of decreasing diameter is so that the containers travelling on conveyor 16 will become properly engaged in the grooves 20. To further insure the proper feeding and spacing of the containers, the root diameter of cylindrical element 18 decreases from the infeed end to a point generally indicated at 170, just forward of the headspacer mechanism 26. From the point 170 to the outfeed end of the cylindrical element 18, the root diameter remains constant so that the containers will be properly aligned in a straight line and properly spaced from each other. Complimentary to having the root diameter decrease from the infeed end to a point 170 and then remain constant from that point to the outfeed end of the cylindrical element 18, the pitch of the helical groove will increase to a point, generally indicated 172, and this is just forward of headspacer mechanism 26. From point 172, the pitch will remain constant throughout the remainder of the cylindrical element to its outfeed end. By having a screw feed conveyor such as cylindrical element 18, the containers advancing on conveyor 16 will be forced by guide elements or rails 22 into engagement with grooves 20 and will be properly spaced therein when they reach a position beneath headspacer unit mechanism 26.

The covering of the cylindrical element 18 may be of the molded rubber screw type of cover as disclosed in the copending United States application of Carl L. Day and Frederick E. Fauth, Serial No. 203,514 filed December 29, 1950. In the aforementioned Day and Fauth application, the advantages of providing a container feed screw having a resilient rubber covering are generally described and it is not believed necessary that the details disclosed therein should be repeated in this specification.

As best shown in Figure 5, molded rubber cylindrical element 18 is provided with a tubular metal core or support member 174. Core 174 is provided with at least one longitudinally extending elongated slot 84 at the infeed end of the cylindrical element 18. As previously explained, a lug or pin element 82 rigidly attached to the shaft 78 is adapted to be received in the slot 84 thereby rotating screw conveyor 18 when stub shaft 78 is driven. A bearing 176 is mounted in the outfeed end of the cylindrical element 18 and is adapted to receive the stub end 178 of a threaded shaft 180. Threaded shaft 180, which has a hand knob 190 on the other end, is adapted to be received in a longitudinally extending, horizontal threaded bore 181 on the outer end of lever arm 60 and provides a means for axially adjusting cylindrical element 18 with respect to piston members 28.

Since it is desirable that cylindrical element 18 be resiliently mounted axially, a washer element 182 is provided on the outer end of shaft 78 adjacent pin 82 and acts as a stop member for one end of the compression spring 184. The other end of the compression spring is provided with an element 185 which abuts against the stop member 186 mounted in the tubular core or support member 174. As shown in Figure 5, stop member 186 is an internal circumferential shoulder in the tube 174, but obviously other forms of stops could be provided.

Thus, it is now evident that cylindrical element 18 may be adjusted axially of headspacer mechanism 26 by backing off a lock nut 188, which is threaded onto shaft 180 and normally abuts lever arm 60, and adjusting threaded shaft 180 by turning hand knob 190 in either direction.

The advantage of adjusting cylindrical element 18 axially is so that the headspacer apparatus may be adapted for use with more than one diameter of containers for a single cylindrical element 18. In other words, within a substantial range of diameters, the same feed screw 18 may be utilized by merely making the proper axial adjustment for indexing the helical grooves thereon in relation to the piston members.

If it is desired to remove and replace cylindrical element 18, the threaded shaft 180 is backed off to such a point where compression spring 184 is no longer under compression. Then cylindrical element 18, is grasped and pressed in an opposite direction from shaft 180. Spring 184 will be compressed to such an extent that stub end 178 of shaft 180 is released from bearing 176. Now the cylindrical element can easily be removed by merely slipping it off of shaft 78.

As previously mentioned in connection with the discussion of the frame and drive for the present invention, cylindrical element 18 is so mounted that it will pivot about an axis parallel to its axis. The purpose of having the cylindrical element pivot about an axis parallel to its axis is to eliminate the use of detector means such as shown in the previously mentioned Day and Breeback application and also to eliminate the chance of a jam, thus, obviating an infeed gate. Further, should there be an actual jam of containers when they reach cylindrical element 18, by having the element pivotal about an axis parallel to its own axis, the containers will be released automatically and the jam will be eliminated without danger to the apparatus or containers.

In previously describing the drive for the cylindrical element, it was mentioned that the cylindrical element was supported by lever arm 60 and the housing 58. Further, it was mentioned that lever arm 60 and housing 58 were adapted to pivot in bosses 52 extending from frame 10. In order that the feed screw will be resiliently urged about the pivotal axis indicated at 192, housing 58 is provided with an arm 194 extending radially therefrom and best shown in Figure 11. The arm 194 has an eye bolt 196 threaded in its outer end. Attached to the eye bolt 196 is one end of a tension spring 198. The outer end of tension spring 198 is attached to an eye bolt 204 extending from a collar 206 clamped to one of the standards 11 of frame 10. When a container enters the apparatus and is not properly positioned on cylindrical element 18, the binding or wedging effect of the containers between guide rails 22 and cylindrical element 18 will cause the cylindrical element to pivot about the axis 192 against the spring tension of spring 198. After the jam has been relieved, spring 198 will return cylindrical element 18 to its proper position. To limit the position of the cylindrical element toward guide rail 22 and the container line, a stop member 200 provided in the frame 10 will engage an ear or flange member 202 extending from the housing 58. The operative position of cylindrical element 18 may be varied by using different length stop members 200.

*Operation*

The headspacer apparatus of the present invention is placed at any convenient position in a conveyor line leading from a filling machine to a cap or closure applying machine. The table 14 of frame 10 is adjusted to receive conveyor 16 along its top surface by means of adjusting nuts 13 which allow adjustment of the height of frame supporting standard 11 with respect to base 12.

After the above preliminary adjustment is made in setting up the apparatus for use with an existing conveyor line, piston members 28 corresponding in diameter to the diameter of containers to be used are placed on the threaded shafts 126 by extending the resilient piston members to fit over retaining element 140. Then cylindrical element 18 is axially adjusted with respect to piston members 28 so that the helical grooves on its periphery will properly position or index the containers beneath the piston members when a particular diameter container is used.

A further minute adjustment of the depth at which piston element 28 will enter the container is made by backing off lock nut 132 and adjusting the threaded shaft 126 by turning knob 130. This adjustment can be made during a run and further increases the utility of the machine in that the entire headspacer mechanism does not have to be adjusted relative to the container when only minute adjustments are required.

After the machine has been properly adjusted for the size of container and the product being compressed in the container, the headspacer apparatus is ready for operation. Dependent upon the speed of conveyor 16, the speed of rotation of conveyor element 18 and of the movement of piston members 28 is controlled by turning hand crank 40 to move the source of power or motor 30 toward or away from the "Reeves" drive 44. By having a speed reductor unit 42 which has two driven shafts extending therefrom, the drive and cylindrical element 18 and the movement of headspacer mechanism 26 is synchronized so that only one adjustment in this respect is needed.

When motor 30 is started, the headspacer apparatus will receive the containers A travelling along conveyor 16 and these containers will be directed by the helical groove 20 and guide element 22 to be properly positioned under headspacer mechanism 26. Piston members 28 of headspacer mechanism 26, which travel in a vertical circular orbit due to their mounting on crank arms 116, will move downwardly in their orbit at such a time when three containers are positioned beneath them. Piston members 28 will travel downward and forward into the containers which are constantly moving forward and will compress the food product contained therein. After piston members 28 have reached their lowermost position they immediately begin to rise as the container is still moving toward the capping or closing machine.

In order that the headspacer apparatus may be utilized where a liquid such as syrup or brine is used to cover the food product in the containers, piston members 28 are provided with a liquid displacement chamber whereby the liquid may rise within the piston member when the piston member is lowered into the container to press down the food content. After the piston member has reached its lowermost point of travel in its vertical circular orbit, it will again rise and the liquid will return to the containers and thereby cover the food product therein.

Should a container enter the headspacer apparatus in such a manner that it is not properly aligned with grooves 20 of cylindrical element 18, the cylindrical element is so mounted that it will pivot on an axis parallel to its axis whereby the pressure on the container is sufficiently relieved to allow the container to properly position itself within the grooves 20. Since cylindrical element 18 is resiliently urged toward the containers and toward guide element 22 on the opposite side of conveyor 16, the cylindrical element will return to its normal operating position when the container has properly positioned itself within groove 20. By having cylindrical element 18 resiliently mounted to pivot about an axis parallel to its own axis, the chances of having a complete jam are greatly minimized and the speed of operation of the container line is maintained.

The terminology used in the specification is for the the purpose of description and not for limitation, as the scope of the invention is defined in the claims.

We claim:

1. In an apparatus for topping filled containers travelling on a conveyor operable to continuously feed the containers in a straight path, a rotary screw conveyor element positioned to one side of said conveyor and having its axis parallel to the path of travel of the containers, said screw conveyor element adapted to engage the sides of said containers as they travel in a straight path and space them with respect to each other, means to rotate said screw conveyor element, a pressing mechanism including a piston member positioned above the path of said containers, and means for rotating said piston member in a circular orbit, said means including a crank and a support member rotatably connected to said crank and on which said piston member is mounted, means for rotating said crank, means interconnecting said last named means and the means for rotating said screw conveyor element whereby said screw conveyor element rotates in synchronism with the movement of said piston in its circular orbital path, pulley means connected to said interconnecting means, a source of power connected to said pulley means, said source of power including a motor slidably mounted to vary its position with respect to said pulley means for increasing or decreasing the speed of rotation of said screw conveyor element and the movement of said piston member in a circular orbit.

2. A resilient rubber piston adapted for quick attachment to a flanged piston holder of a pressing mechanism used in topping filled containers, said piston being generally cylindrical and of a size to insert within the top of a filled container, said piston having an axial bore therein extending from the upper end thereof, said bore having an enlarged counter-bore positioned adjacent the upper end of said piston, said counterbore being spaced from the upper and lower ends of said piston and being closer to the upper end of said piston than the lower end of said piston and capable of receiving the flanged piston holder, and means in said piston positioned below said counterbore and providing for displacement of liquid in said filled containers when said piston is inserted therein.

3. A resilient rubber piston of the type described in claim 2 wherein said piston is provided with at least one longitudinal bore extending from the lower end of and communicating with said enlarged counter-bore, at least one transverse bore extending from the side of said piston and communicating with said enlarged counterbore, said longitudinal and transverse bores providing a passage communicating the inside of a filled container to atmosphere when said piston is lowered therein.

4. A resilient rubber piston of the type described in claim 2 wherein said axial bore extends through said piston from the upper end to the lower end thereof, and said piston is provided with a transverse bore extending from the side of said piston into open communication with said axial bore, said transverse bore being positioned below said counter-bore.

5. A resilient rubber piston of the type disclosed in claim 2 wherein said piston is provided with a deep circumferential groove positioned on its periphery adjacent and spaced from the lower end thereof which permits the lower end of said piston to deflect when aligning it with the container.

6. In an apparatus for topping filled containers travelling on a conveyor operable to continuously feed the containers in a straight path, a frame, a pressing mechanism mounted on said frame and including a plurality of aligned piston members positioned above and parallel to the path of containers, said piston members movable into and out of said containers, a generally cylindrical element positioned on said frame with its axis substantially parallel to and at one side of said path of containers, said cylindrical element having its periphery provided with a helical groove for spacing containers beneath said piston members, a pair of supporting devices rotatably supporting said cylindrical element at each end thereof, each of said supporting devices being pivotally mounted to said frame whereby said cylindrical element can pivot on an axis parallel to its axis away from the path of the containers, means resiliently urging said cylindrical element toward the path of said containers, and an element on the opposite side of said path of containers having a vertical planar face substantially parallel to the path of containers.

7. In an apparatus of the type described in claim 6 including means to rotate said cylindrical element, said last mentioned means being positioned within one of said support means.

8. In an apparatus of the type described in claim 6 wherein the helical groove of said cylindrical element is of increasing pitch from its infeed end to a point forward of said piston members and is constant from said point to the outfeed end, and means for axially adjusting of said cylindrical element whereby said apparatus will accommodate containers of various sizes.

9. In an apparatus of the type described in claim 6 including means to adjust said cylindrical element axially.

10. In an apparatus of the type described in claim 6 including means to resiliently mount said cylindrical element axially in said supporting devices.

11. In an apparatus of the type described in claim 6 including means to resiliently mount said cylindrical element axially in said supporting devices and means to adjust said cylindrical element axially.

12. In an apparatus of the type described in claim 6 wherein the helical groove of said cylindrical element has a root diameter decreasing from the infeed end thereof to a point forward of said piston members and is of a constant diameter from said point to its outfeed end, the periphery of said cylindrical element being a constant diameter from its outfeed end to a point adjacent its infeed end and being of decreasing diameter from said last mentioned point to its infeed end.

13. In an apparatus of the type described in claim 12 wherein the helical groove of said cylindrical element is of increasing pitch from its infeed end to a point forward of said piston members and is of constant pitch from said last mentioned point to its outfeed end, and means to axially adjust the cylindrical element whereby said apparatus will accommodate containers of various sizes.

14. A mechanism to space containers moving along a straight path at random comprising a frame, a generally cylindrical element positioned with its axis substantially parallel to and at one side of said path, said element having its periphery provided with a helical groove for spacing containers, a pair of supporting devices pivotally mounted on said frame in alignment with each other and supporting said cylindrical element therebetween, means resiliently urging said cylindrical element toward the path of containers, and an element on the opposite side of said path of containers having a vertical planar face substantially parallel to the path of the containers.

15. In an apparatus for topping filled containers travelling on a conveyor operable to continuously feed the containers in a straight path, a frame, a pressing mechanism mounted on said frame and including a plurality of aligned piston members positioned above and parallel to the path of containers, said piston members movable into and out of said containers, a generally cylindrical element positioned on said frame with its axis substantially parallel to and at one side of said path of containers, said cylindrical element having its periphery provided with a helical groove for spacing containers beneath said piston members, an element on the opposite side of said path of containers having a vertical planar facing substantially parallel to the path of the containers, and means to adjust said cylindrical element axially of its length so the position of said helical groove is varied relative said piston members whereby said cylindrical element can accommodate containers of different diameters.

16. In an apparatus of the type described in claim 15 including means resiliently urging said cylindrical element toward said adjustment means.

17. A mechanism to space containers travelling in a straight path beneath a mechanism for operating simultaneously on a plurality of containers comprising a generally cylindrical element positioned with its axis substantially parallel to and at one side of said path, said element having its periphery provided with a helical groove for engaging and spacing the containers, said helical groove having a root diameter decreasing from the infeed end of said cylindrical element to a point forward of said mechanism and being of a constant root diameter from said point to its outfeed end, and said helical groove having an increasing pitch from its infeed end to a point forward of said mechanism and a constant pitch from said last mentioned point to its outfeed end, means for supporting and rotating said cylindrical element, and means for axially adjusting said cylindrical element whereby containers of different sizes can be accommodated.

18. A mechanism of the type described in claim 17 including means to resiliently urge said cylindrical element axially toward said adjustment means.

19. A mechanism of the type described in claim 18 wherein said last mentioned means includes a compression spring mounted centrally of said cylindrical element.

20. In an apparatus for topping filled containers, a pressing mechanism including a support member, a vertical shaft connected to said support member, a flange element mounted on the lower end of said vertical shaft and having a diameter greater than the diameter of said shaft, a resilient piston member having an axial longitudinal bore therein extending from the upper surface thereof, said bore having a counterbore therein of diameter substantially equal to the diameter of said flange element, said counterbore being spaced from the upper and lower surfaces of said piston and being closer to the upper surface than to the lower surface, said piston member being mounted on said shaft by extending said axial longitudinal bore and insertion of said flange element into said counterbore, and means in said piston member positioned below said counterbore for receiving liquid from containers when said piston member is lowered into containers and for returning liquid to containers when said piston is raised therefrom.

21. In an apparatus of the type described in claim 20 wherein the liquid receiving means of said piston member includes at least one longitudinal passage extending upwardly from the lower surface of said piston member and terminating short of the upper surface of said piston member, and at least one transverse passage extending from the peripheral surface of said piston and communicating with the last mentioned longitudinal passage.

22. In an apparatus of the type in claim 20 wherein the axial longitudinal bore in said piston member extends through said piston member to the lower surface thereof, and said piston member having at least one radially extending passage positioned below said counter-bore and communicating said axial longitudinal bore with atmosphere, said bore and said passage providing a space for the displacement of liquid in said containers when said piston is lowered therein.

23. In an apparatus of the type in claim 20 wherein said flange element includes a peripheral groove and a shallow recess on the under surface thereof, said peripheral groove communicating with said shallow recess by at least one radial passage in said flange element, said resilient piston having at least one longitudinal bore extending from the lower surface thereof and at least one radial bore for communicating the outside of said piston with said counter-bore, said longitudinal bore extending from the lower surface of said piston and communicating with said atmosphere through said shallow recess in said flange element, said radial passage in said flange element, and said radial bore in said piston member.

24. In an apparatus of the type described in claim 20 wherein said resilient piston member is generally cylindrical and is provided with a deep radially outwardly facing groove adjacent to and spaced from the lower end thereof.

References Cited in the file of this patent

UNITED STATES PATENTS

| | | |
|---|---|---|
| 968,614 | Waterhouse | Aug. 30, 1910 |
| 1,177,792 | Mims | Apr. 4, 1916 |
| 2,289,852 | Mondloch | July 14, 1942 |
| 2,350,438 | Woertz | June 6, 1944 |
| 2,367,387 | Davies | Jan. 16, 1945 |
| 2,432,823 | Sedwick | Dec. 16, 1947 |
| 2,454,285 | Krueger | Nov. 23, 1948 |
| 2,529,199 | Stover | Nov. 7, 1950 |
| 2,562,364 | Oates | July 31, 1951 |
| 2,571,036 | Heyne et al. | Oct. 9, 1951 |
| 2,630,952 | Barnby et al. | Mar. 10, 1953 |
| 2,652,954 | Nowak | Sept. 22, 1953 |